US007792088B2

(12) United States Patent
Ahn et al.

(10) Patent No.: US 7,792,088 B2
(45) Date of Patent: Sep. 7, 2010

(54) METHOD FOR PARTITIONING RESOURCE SPACE, ASSIGNING PHYSICAL CHANNEL, AND ALLOCATING POWER IN OFDMA-BASED CELLULAR SYSTEM

(75) Inventors: Jae-Young Ahn, Daejeon (KR); Kwang-Soon Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 862 days.

(21) Appl. No.: 10/579,892

(22) PCT Filed: Sep. 8, 2004

(86) PCT No.: PCT/KR2004/002278

§ 371 (c)(1),
(2), (4) Date: Jan. 23, 2007

(87) PCT Pub. No.: WO2005/050873

PCT Pub. Date: Jun. 2, 2005

(65) Prior Publication Data

US 2007/0127359 A1    Jun. 7, 2007

(30) Foreign Application Priority Data

Nov. 19, 2003  (KR)  ............... 10-2003-0082150

(51) Int. Cl.
*H04B 7/208* (2006.01)

(52) U.S. Cl. ............... 370/344; 370/437; 370/465; 370/480; 375/267; 375/299; 455/450

(58) Field of Classification Search ........... 370/203, 370/208, 310, 328, 431, 437, 464, 465, 468, 370/480, 485, 486, 487; 455/403, 422.1, 455/450, 452.1, 452.2, 39, 500, 507, 517, 455/522

See application file for complete search history.

(56) References Cited

U.S. PATENT DOCUMENTS 5,634,195 A * 5/1997 Sawyer .................. 455/522

(Continued)

FOREIGN PATENT DOCUMENTS

CN  1432221 A  7/2003

(Continued)

OTHER PUBLICATIONS

Pottie et al.; "Channel Coding Strategies for Cellular Radio"; IEEE; Nov. 1995; pp. 763-770.

(Continued)

*Primary Examiner*—Seema S Rao
*Assistant Examiner*—Khoa Huynh
(74) *Attorney, Agent, or Firm*—Lowe Hauptman Ham & Berner LLP

(57) ABSTRACT

Disclosed is a method for partitioning resource spaces, and allocating physical channels and power in an OFDMA-based cellular system. A resource within a slot is partitioned into resource spaces in common in a plurality of adjacent cells, and the partitioned resource spaces are partitioned into resource sets according to sizes of physical channels in the adjacent cells. The physical channels classified by predetermined characteristics are respectively assigned to the partitioned resource sets within the resource space. Further, the resource space for transmitting traffic channels between two different cells is partitioned into resource spaces so that the traffic channels in the same subspace may be collided with each other, and a power control is applied between the collided channels to control the interference from the adjacent cells.

10 Claims, 6 Drawing Sheets

U.S. PATENT DOCUMENTS

| | | | |
|---|---|---|---|
| 5,787,352 A * | 7/1998 | Benveniste | 455/452.2 |
| 6,011,800 A * | 1/2000 | Nadgauda et al. | 370/437 |
| 6,128,498 A | 10/2000 | Benveniste | |
| 6,473,418 B1 | 10/2002 | Laroia | |
| 6,539,228 B1 * | 3/2003 | Tateson | 455/446 |
| 6,591,108 B1 | 7/2003 | Herrig | |
| 2001/0043576 A1 * | 11/2001 | Terry | 370/328 |
| 2003/0031147 A1 | 2/2003 | Zeira et al. | |
| 2004/0192218 A1 * | 9/2004 | Oprea | 455/73 |
| 2005/0068916 A1 * | 3/2005 | Jacobsen et al. | 370/328 |

FOREIGN PATENT DOCUMENTS

| | | |
|---|---|---|
| DE | 198 00 953 | 7/1999 |
| JP | 2003-304574 | 10/2003 |
| WO | WO 01/33742 | 5/2001 |
| WO | WO 02/054441 | 7/2002 |

OTHER PUBLICATIONS

International Search Report dated Mar. 11, 2005 for PCT/KR2004/002278.

X. Qiu, et al.; "Network assisted resource management for wireless data networks"; IEEE Selected Areas Commun., vol. 19, pp. 1222-1234, Jul. 2001.

A.R.S. Bahai, et al.; "Multicarrier digital communications: theory and application of OFDM"; Kluwer Academic, NJ, USA, pp. 25-27 for the partial Fourier transform.

Office Action dated Mar. 6, 2009, for Chinese application No. 200480040216.5.

Office Action dated Mar. 6, 2009, for Chinese application No. 2004800402165.

U.S. Appl. No. 09/539,157, filed Dec. 2002, Walton et al.

* cited by examiner

[Fig. 2]

METHOD FOR PARTITIONING RESOURCE SPACE, ASSIGNING PHYSICAL CHANNEL, AND ALLOCATING POWER IN OFDMA-BASED CELLULAR SYSTEM

CROSS REFERENCE TO RELATED APPLICATION

This application is the National Phase application of International Application No. PCT/KR2004/002278, filed Sep. 8, 2004, which designates the United States and was published in English. This application, in its entirety, is incorporated herein by reference.

TECHNICAL FIELD

The present invention relates to an OFDMA (Orthogonal Frequency Division Multiple Access)-based cellular system. More specifically, the present invention relates to a method for partitioning resource spaces, assigning physical channels, and allocating power in an OFDMA-based cellular system for configuring a physical link resource with a plurality of resource spaces, and configuring a resource space with a plurality of resource subspaces to easily control inter-cell interference for each channel characteristic in an OFDMA-based cellular system.

BACKGROUND ART

In general, ISI (Inter-Symbol Interference) according to multiple paths is generated to receive signals when transmitting signals through a multi-path channel. In particular, the ISI is further reinforced in the case of high-speed data transmission since a symbol period is less than a delay spread of a channel, and hence, more complex receiving methods are required so as to compensate for distortion caused by the ISI and restore accurate transmit signals. In order to reduce a distortion phenomenon of signals caused by the ISI, the symbol period is to be greater than the delay spread of the channel, and the OFDM method has been proposed as a modulation method for simply compensating for the distortion of the multi-path channel.

The OFDM method uses a plurality of subcarriers having orthogonality to transmit data, differing from the transmission method which uses single carriers. That is, the OFDM method performs serial and parallel conversion on the input data by the number of subcarriers used for modulation, and modulates the respective converted data by using the corresponding subcarriers to thereby maintain data rates and increase the symbol period for each subcarrier by the number of subcarriers. Since the OFDM method uses subcarriers having orthogonality, it has better bandwidth efficiencies and longer symbol periods compared to the existing FDM (Frequency Division Multiplex) method, and it has an ISI-resistance characteristic compared to the single carrier modulation method.

The modulation and demodulation process at a transmitter and a receiver in the OFDM system corresponds to execution of IDFT (Inverse Discrete Fourier Transform) and DFT (Discrete Fourier Transform), and it can also be realized effectively by using IFFT (Inverse Fast Fourier Transform) and FFT (Fast Fourier Transform). Further, when a guard interval which is longer than the delay spread of the channel is inserted for each symbol period, the inter-carrier orthogonality is maintained to generate no ICI (Inter-Carrier Interference), and no OFDM symbols caused by the multi-path channel are superimposed to completely eliminate adjacent inter-symbol ISI.

The conventional TDMA-based cellular system uses a different frequency in the adjacent cell to reduce interference by other cells. The method, however, reduces the total system capacity because of low frequency reuse efficiencies. The existing CDMA-based cellular system, such as the IS-95, the CDMA2000, and the W-CDMA, uses spread spectrum codes to decrease interference caused by channels of other cells by the spread components, and averages the interference of various channels of the cells to use the identical frequency in the adjacent cell. However, the IEEE802.11a, the Hiperlan/2, and the DAB (Digital Audio Broadcasting) on the conventional OFDM basis have been designed in environments other than that for the cellular system, and no consideration for reducing the inter-cell interference has been studied. In this instance, the inter-cell interference is reduced by using a different frequency in the adjacent cell, but the frequency reuse efficiencies are degraded, and the system capacity is decreased.

In order to improve the frequency reuse efficiencies in the above-noted OFDMA-based cellular system, the dynamic packet allocation method and the dynamic channel allocation method are used (refer to 'Network-assisted resource management for wireless data networks,' by X. Qiu, K. Chawla, J. C. I. Chuang, and N. Sollenberger, IEEE Selected Areas Commun, Vol. 19, pp. 1222-1234, July 2001). Adjacent cells communicate with signaling, and they do not transmit data to the channel which another adjacent cell uses. This method gives good theoretical performance, but it is not appropriate for the actual systems because of a large amount of overheads.

Further, the OFDMA-based cellular system uses the frequency hopping method to average the inter-cell interference, and uses different frequency hopping patterns for the respective cells so that a channel of a cell may uniformly collide with many channels of another cell, and the inter-cell interference may accordingly be averaged, which is disclosed by the OFDMA method of the IEEE802.16a. However, since the IEEE802.16a averages the interference without distinguishing the channels, the required SNR (Signal to Noise Ratio) is also averaged since the channels are mixed, and hence, it is difficult to control the inter-cell interference.

DISCLOSURE OF INVENTION

Technical Problem

It is an advantage of the present invention to provide a method for partitioning resource spaces and assigning channels and power for easily controlling inter-cell interference for respective channels having different characteristics, and enhancing frequency reuse efficiencies in an OFDMA-based cellular system.

Technical Solution

In one aspect of the present invention, a method for partitioning resource spaces and assigning physical channels and power in an OFDMA-based cellular system, comprises:

(a) partitioning a resource within a slot into resource spaces, in common in a plurality of adjacent cells;

(b) partitioning the partitioned resource spaces into resource sets according to respective sizes of physical channels in the adjacent cells; and (c) assigning the physical channels classified based on characteristics to the partitioned resource sets within the resource space.

In another aspect of the present invention, a method for partitioning resource spaces and assigning physical channels and power in an OFDMA-based cellular system, comprises:

(a) partitioning a resource within a slot into resource spaces, in common in a plurality of adjacent cells;

(b) partitioning the partitioned resource spaces into resource subspaces, in common in the adjacent cells;

(c) partitioning the partitioned resource spaces and the resource subspaces into resource sets according to respective sizes of physical channels in the adjacent cells; and (d) assigning the physical channels classified based on characteristics to the partitioned resource sets within the resource space and the resource subspace.

The resource space is partitioned so that a combination of the total or part of common channels, dedicated control channels, shared control channels, dedicated traffic channels, and shared traffic channels is allocated in a resource space.

The step (b) comprises partitioning the resource space through which the common channel, the dedicated control channel, and the shared control channel of each cell into resource subspaces so that the channels with similar physical channel characteristics may be transmitted at a subspace.

The resource set is partitioned to be collided as uniformly as possible with all the resource sets within the same resource space of another adjacent cell.

The resource set is partitioned to be collided as uniformly as possible with all the resource sets within one of the same resource space and the resource subspace of another adjacent cell.

The subcarriers which constitute the resource space are configured by a subcarrier set which covers wide frequency band and has a predetermined spacing between constituent adjacent sub-carriers.

The subcarrier which configures the resource space and the resource subspace is configured by a subcarrier set which covers at least one wide frequency band and has a predetermined interval.

The method comprises: allocating a transmit power of the resource space to a physical channel which uses a fixed transmit power from among the physical channels assigned to the resource set; and allocating a power within the maximum transmit power of the resource space to a physical channel which uses a variable transmit power from among the physical channels assigned to the resource set.

The method further comprises: allocating a transmit power of the resource subspace to a physical channel which uses a fixed transmit power from among the physical channels assigned to the resource set; and allocating a power within the maximum transmit power of the resource subspace to a physical channel which uses a variable transmit power from among the physical channels assigned to the resource set.

The transmit power is allocated by considering cell sizes, interference of adjacent cells, and a required SNR.

The maximum transmit power is allocated by considering cell sizes, interference of adjacent cells, and a required SNR.

The method further comprises: partitioning the resource space through which the traffic channel is transmitted into resource subspaces by the number of adjacent cells according to a cell arrangement; and allowing a transmit power higher than that of another resource subspace to a resource subspace for each cell, and differentiating the resource subspace with the allowed high transmit power for each adjacent cell.

A user who needs a high transmit power for each cell is allowed to use a traffic channel of the resource subspace with the allowed high transmit power.

Advantageous Effects

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

With reference to drawings, operations of partitioning resource spaces and assigning physical channels and power in an OFDMA-based cellular system according to a preferred embodiment of the present invention will be described.

Figure 1:
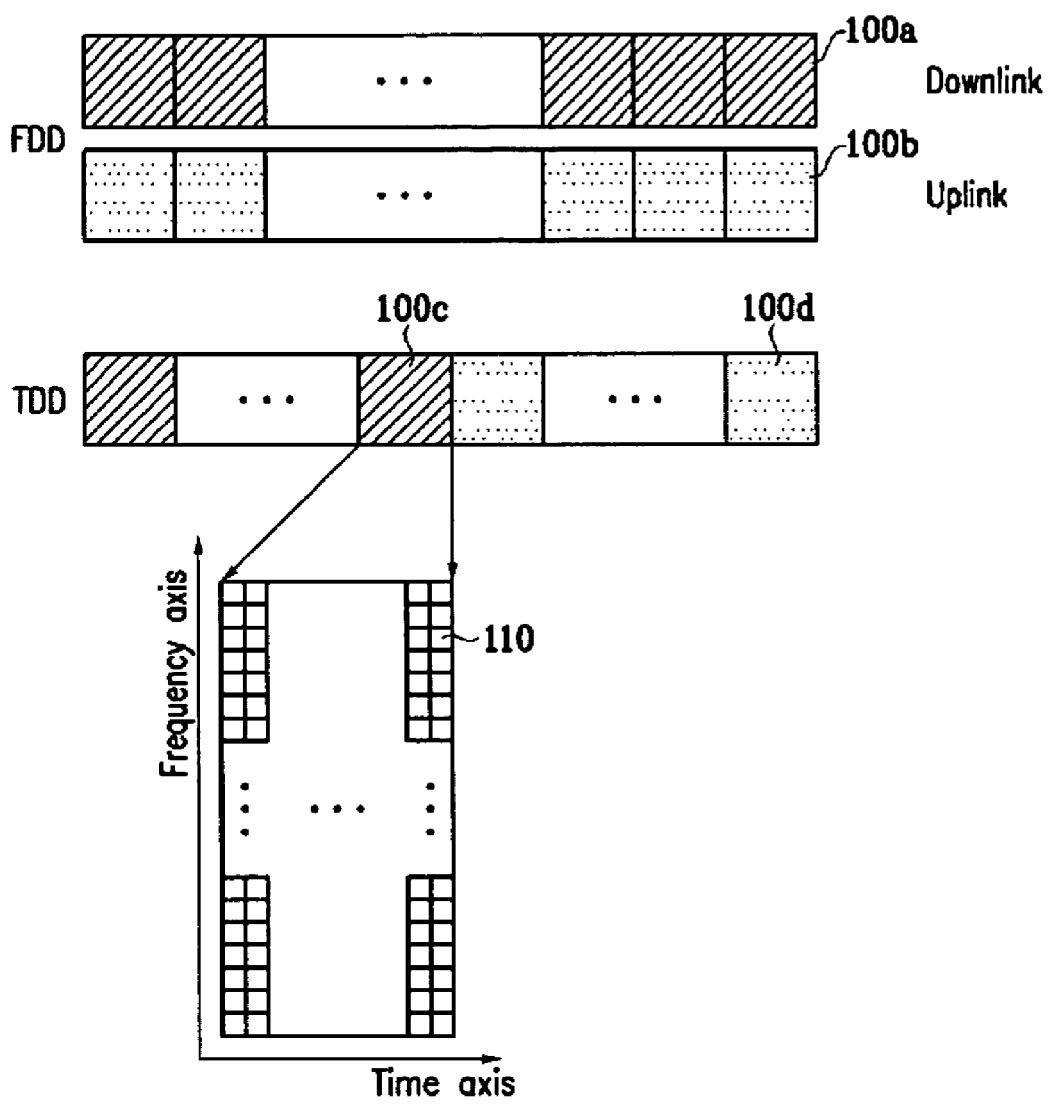
FIG. 1 shows a frame configuration of an OFDMA-based cellular system according to a preferred embodiment of the present invention.

FIG. 1 shows a frame configuration of an OFDMA-based cellular system according to a preferred embodiment of the present invention.

In an FDD (Frequency Division Duplex) system, physical link signals of an uplink and a downlink include slots 100a and 100b which continue with respect to time and are distinguishable by different frequency bands.

In a TDD (Time Division Duplex) system, the physical link signals use the same frequency band, and an uplink slot 100d and a downlink slot 100c are divided with respect to time.

Each slot 100a, 100b, 100c, and 100d includes resources 110 of as many as the product of a number of subcarriers used for transmission and a number of OFDM symbols within a slot. A length of a slot and a number of resources within a slot can be fixed or variable.

Figure 2:
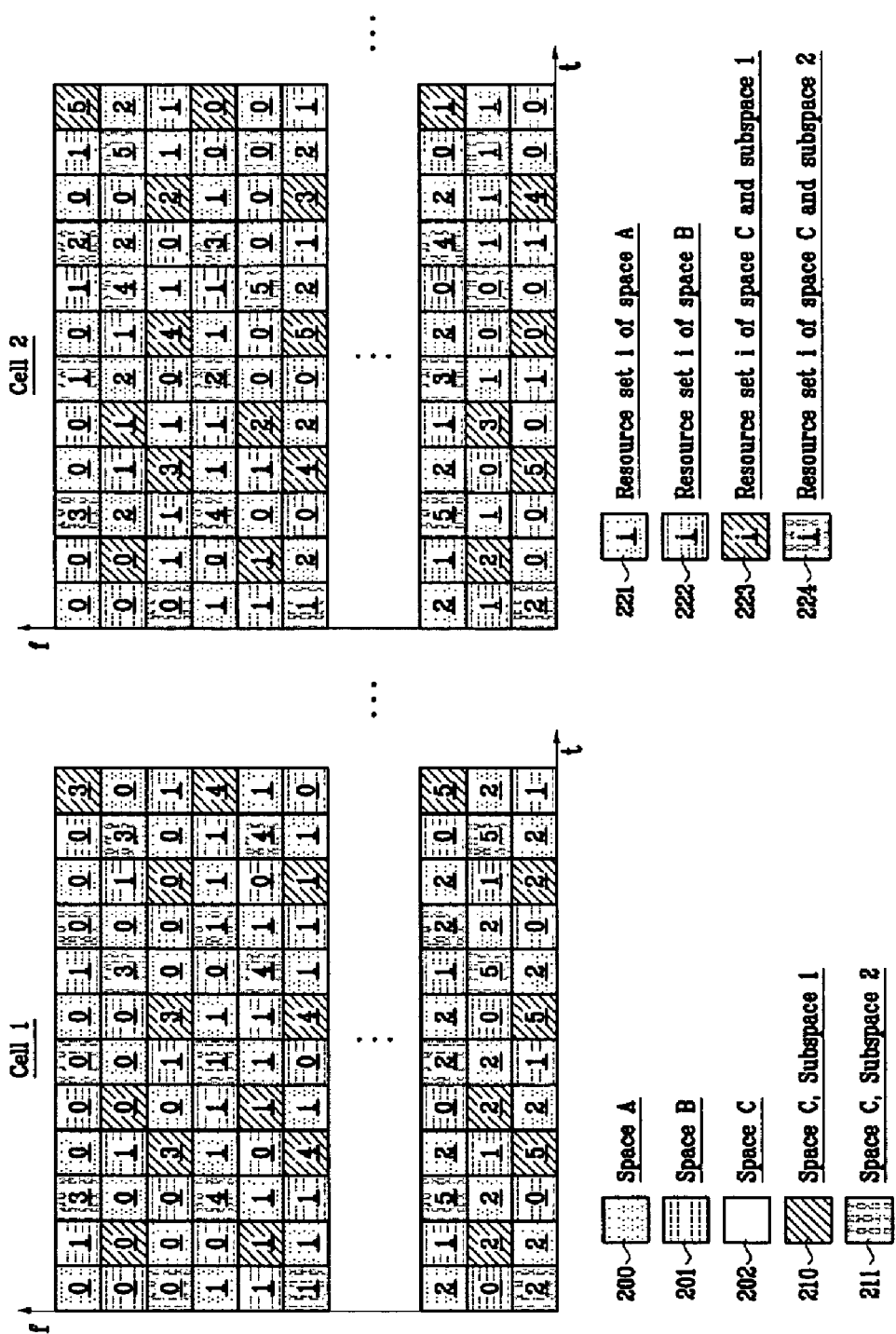
FIG. 2 shows an exemplified schematic diagram for partitioning a resource space, a resource subspace, and a resource set according to a preferred embodiment of the present invention.

FIG. 2 shows an exemplified schematic diagram for partitioning a resource space, a resource subspace, and a resource set according to a preferred embodiment of the present invention.

Referring to FIG. 2, the slot of the OFDMA-based cellular system is partitioned into resource spaces A (200), resource spaces B (201), and resource spaces C (202), and the resource spaces C are partitioned into first resource subspaces 210 and second resource subspaces 211.

Also, the resource space A is partitioned into three resource sets 221, the resource space B is partitioned into two resource sets 222, the first resource subspace is partitioned into six resource sets 223, and the second resource subspace is partitioned into six resource sets 224.

In this instance, adjacent cells Cell 1 and Cell 2 have the same resource spaces 200, 201, and 202 and resource subspaces 210 and 211, but the resource sets 221, 222, 223, and 224 are different, and a single resource set of a resource space of a single cell is arranged to be collided as uniformly as possible with the resource sets of the same resource space of another cell.

The arrangement is varied according to the number of the resource sets and the number of resources of a single resource set. For example, the arrangement can be performed according to pseudorandom codes, and in particular, the resource sets of a cell can be uniformly arranged and superimposed on the resource sets of an adjacent cell by as many as the number obtained by dividing the number of resources of the resource sets by the number of resource sets, when a number of resource sets, a number of adjacent cells, and a number of resources of a single resource set are appropriately selected. One exemplar thereof is disclosed in 'Channel coding strategies for cellular radio' by G. J. Pottie and R. Calderbank, IEEE Trans. Vehic. Techn, Vol. 44, pp. 763-770, November 1995.

Differing from the above-described conventional patent and transaction, the preferred embodiment of the present invention is characterized in that the resource sets of an adjacent cell are collided as uniform as possible within a single resource space or a resource subspace, and the resource sets of different resource spaces or resource subspaces are not collided with each other.

Here, the methods of configuring the resource spaces or resource subspaces are not restricted by specific methods. That is, the different resource spaces can be distinguished by time or frequency within a slot, and in general, the configuration is performed by combining the time and frequency distinguishments.

Also, frequency diversity is obtained by configuring subcarriers which constitute a single resource space or a resource subspace to a single subcarrier set or a plurality of subcarrier sets having a predetermined spacing and covering a wide frequency bandwidth, and reduces power consumption using a partial Fourier transform in the case of a mobile station for receiving physical channels provided in the corresponding resource space or resource subspace (refer to 'Multi-carrier digital communications: theory and application of OFDM' by A. R. S. Bahai and B. R. Salzberg, Kluwer Academic, NJ, USA, pp. 25-27 for the partial Fourier transform.)

Figure 3:
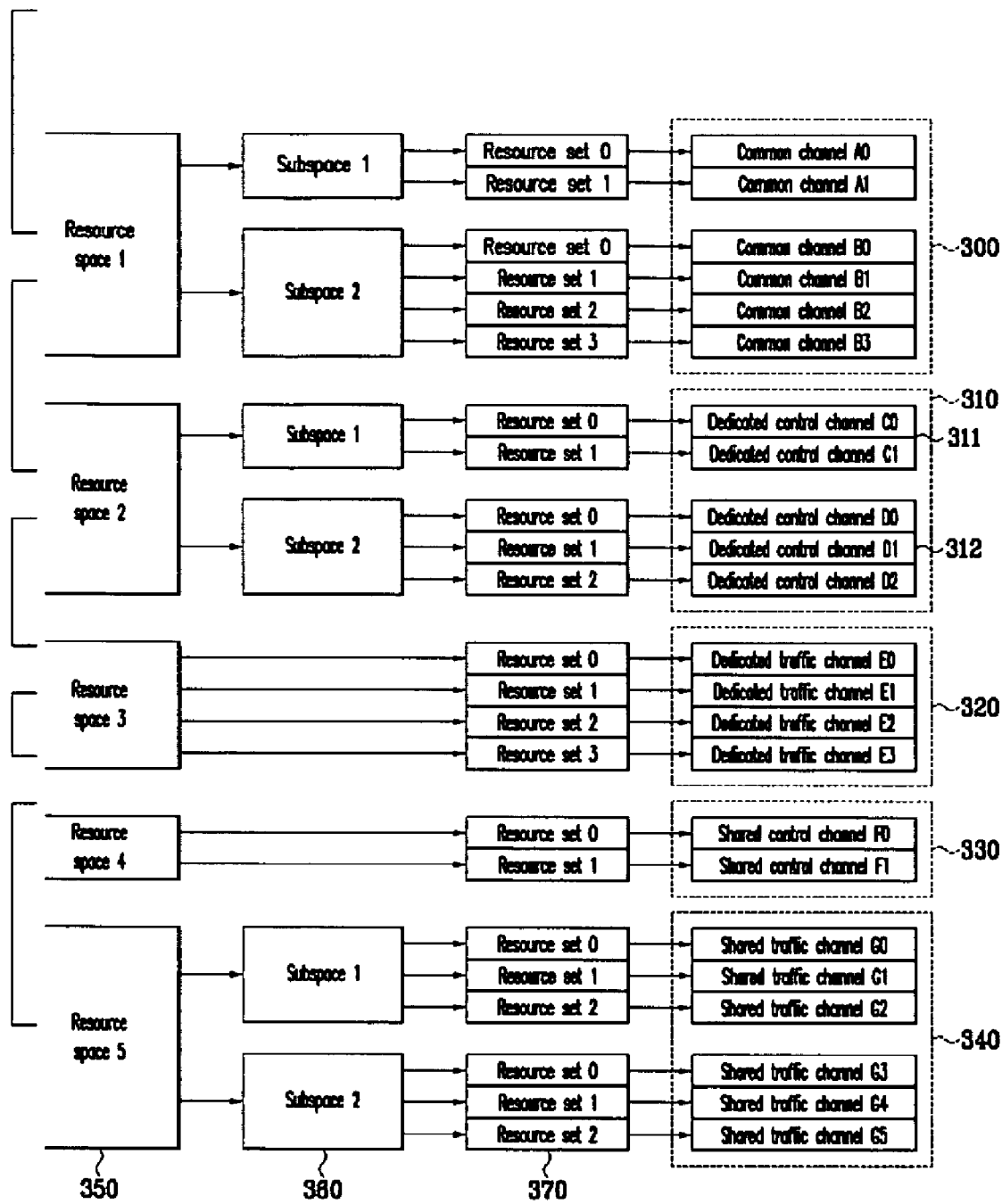
FIG. 3 shows an exemplified schematic diagram for assigning physical channels to respective resource sets in an OFDMA-based cellular system according to a preferred embodiment of the present invention.

FIG. 3 shows an exemplified schematic diagram for assigning physical channels to respective resource sets in an OFDMA-based cellular system according to a preferred embodiment of the present invention.

The cellular system generally includes a common channel 300 which is commonly used for the cells, a dedicated control channel 310 allocated to the users, a dedicated traffic channel 320 allocated to the users, a shared control channel 330 shared by part of the users, and a shared traffic channel 340 shared by part of the users, and for example, the dedicated control channel 310 from among the respective channel categories can further be divided into channels 311 and 312 which have different characteristics, such as receive powers, according to functions, sizes, modulation methods, and encoding methods of the dedicated control channel 310. In this instance, the common channel 300, the dedicated control channel 310, and the shared control channel 330 which have the same required receive power are transmitted in a bundle through resource sets of a single resource space or a resource subspace. That is, the channels of an adjacent cell which influences the common channel or the control channel of a cell are established to be channels which have characteristics, such as the required receive power, similar to the above-noted channels.

When the required receive power is different, the transmit power becomes different, and when a channel with a greater transmit power and a channel with a lesser transmit power are mixed, the channel with a lesser transmit power is substantially interfered. However, since the channels with similar transmit powers are interfered in the preferred embodiment, the interference of the adjacent cell is easily controlled.

Also, differing from the common channels and the control channels, the traffic channels 340 use various modulation methods and encoding methods according to channel conditions and traffic amounts, and accordingly, the resource space 350 through which the traffic channels 340 are transmitted is partitioned into at least one resource subspace 360, and the traffic channels are transmitted through the resource sets 370 of the respective resource subspaces 360.

FIG. 3 shows a case of using two resource subspaces, and when a single resource subspace 360, through which the traffic channel 340 is transmitted, is provided, the single traffic channel 340 is interfered by all the traffic channels in the adjacent cell as uniformly as possible, and when plural resource subspaces 360 are provided, the traffic channel 340 is interfered by the traffic channel within the same resource subspace of the adjacent cell.

Therefore, the effect of averaging the inter-cell interference is the largest when a single resource subspace is provided, but the transmit power of the resource subspace through which the traffic channel is transmitted for each cell is effectively controlled to thereby easily control the inter-cell interference, and the frequency reuse efficiencies of the cellular system can be increased by considering the control of the transmit power at the time of configuring sectors and arranging the cells.

Figure 4:
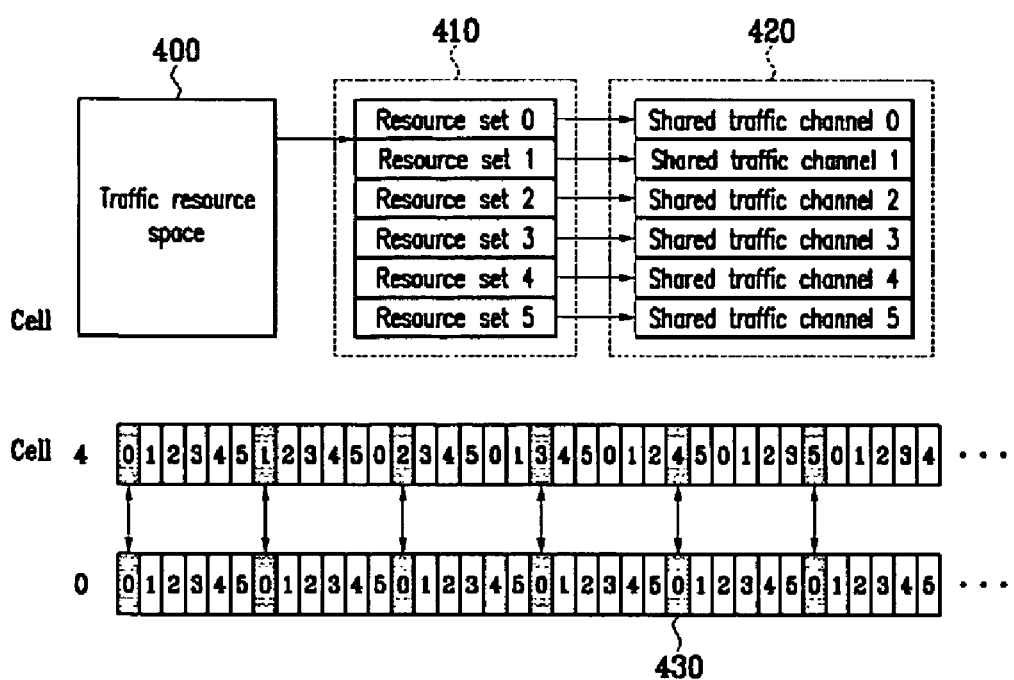
FIG. 4 shows an exemplified partition of traffic resource sets when a resource space through which a traffic channel will be transmitted is not partitioned into resource subspaces in an OFDMA-based cellular system according to a preferred embodiment of the present invention.

FIG. 4 shows an exemplified partition of traffic resource sets when a resource space through which a traffic channel will be transmitted is not partitioned into resource subspaces in an OFDMA-based cellular system according to a preferred embodiment of the present invention.

Referring to FIG. 4, the resource space through which the traffic channels will be transmitted is not partitioned into resource subspaces in the OFDMA-based cellular system, but the traffic channel of a cell is controlled to be collided as uniformly as possible with all the traffic channels of another cell to thus average the inter-cell interference.

That is, the traffic resource space 400 is partitioned into a plurality of resource sets 410, and they are allocated to the traffic channels 420. In this instance, the resource sets 410 are partitioned for each cell so that the traffic channels of a cell may be collided as uniformly as possible with all the traffic channels of another cell.

FIG. 4 exemplifies a case of partitioning resource sets in the two cells so that the 0th resource set 430 of the Cell 0 may be uniformly collided with the six resource sets of the Cell 4. This method is more appropriate for the case in which the radius of the cell is large when the traffic density is not high.

Figure 5:
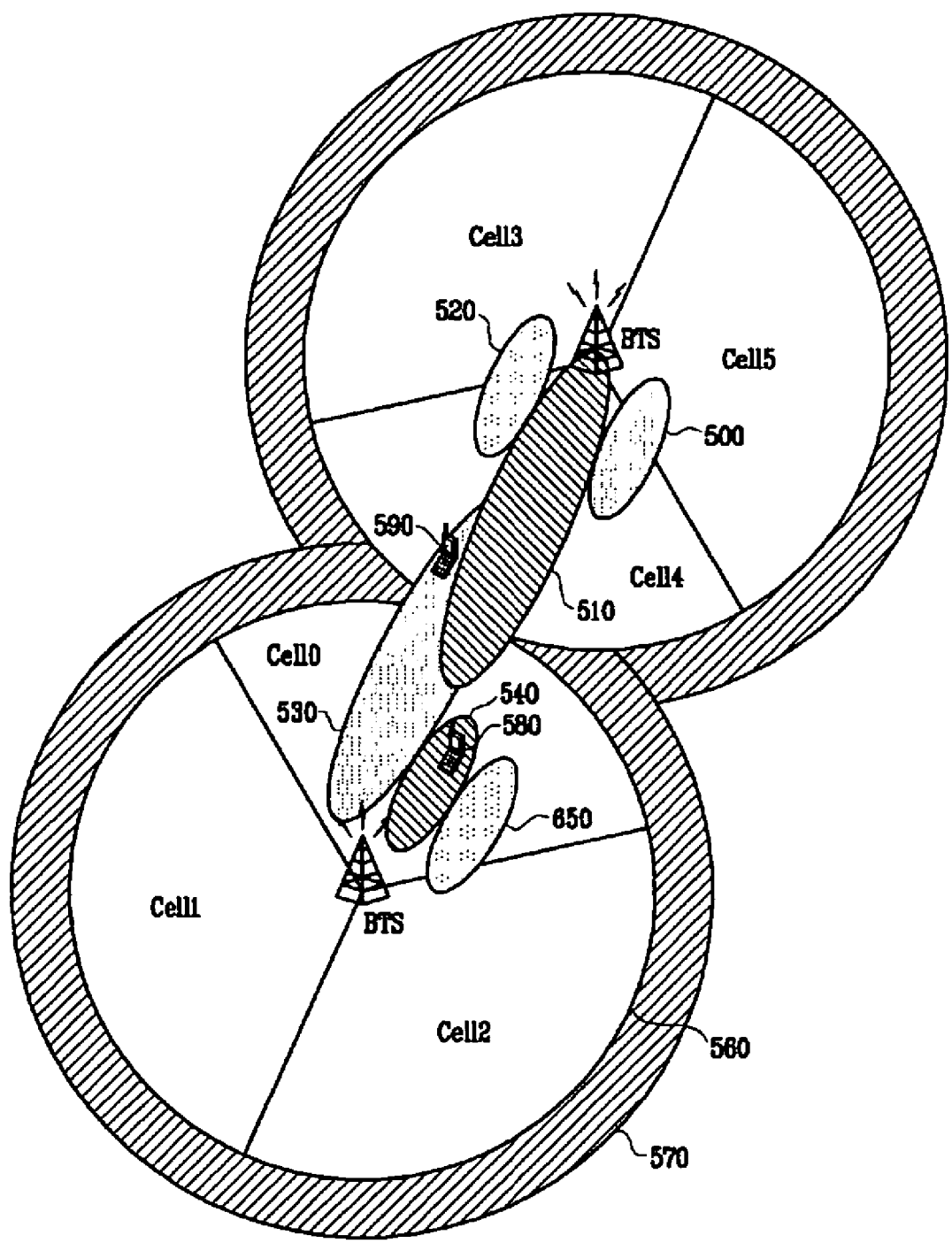
FIG. 5 shows a case for partitioning a resource space through which a traffic channel will be transmitted into a plurality of resource subspaces, and allowing different maximum transmit powers of the respective resource subspaces to increase frequency reuse efficiencies in an OFDMA-based cellular system according to a preferred embodiment of the present invention.

FIG. 5 shows a case for partitioning a resource space through which a traffic channel will be transmitted into a plurality of resource subspaces, and which allows different maximum transmit powers of the respective resource subspaces to increase frequency reuse efficiencies in an OFDMA-based cellular system according to a preferred embodiment of the present invention. That is, FIG. 5 shows a method for using a resource subspace through which a plurality of traffic channels will be transmitted, and which allows a transmit power in a single resource subspace higher than a transmit power in another resource subspace for each cell, thereby increasing the frequency reuse efficiencies of the cellular system.

In detail, a traffic channel of a normal resource subspace is assigned to a user 580 (a user who stays within the cell), to whom it is able to transmit traffic channels with less power within a cell, and a traffic channel of the resource subspace allowed with a high transmit power is assigned to a user 590 (a user who stays on the border of a cell), to whom it is required to transmit them with high power. As a result, the user within the cell is rarely interfered by the adjacent cell because of attenuation, and the user on the border the cell is rarely interfered by the adjacent cell since the adjacent cell does not increase the power transmitted to the same resource subspace in the adjacent cell.

In FIG. 5, a high power is allocated to the first resource subspace 530 in Cell 0, and a normal power is allocated to the second and third resource subspaces 540 and 550 when three traffic resource subspaces are respectively used by the two cells Cell 0 and Cell 4.

In a like manner, a high power is allocated to the second resource subspace 510 in Cell 4, and a normal power is allocated to the first and third resource subspaces 500 and 520. Accordingly, in Cell 0, the traffic channels are transmitted to the user 580 who stays in the cell size 560 which is used for transmission with a normal power through the second or third resource subspace (the first resource subspace can also be used), and the traffic channels are transmitted only through the first resource subspace to the user 590 who stays inside the cell size 570 which is used for transmission with a high power and stays outside the cell size 560 which is used for transmission with a normal power. In this instance, the user 580 who stays in the cell size 560 at the transmission with a normal power is less interfered by Cell 4 since the user 580 is far from Cell 4, and the user 590 who stays inside the cell size 570 at the transmission with a high power and stays outside the cell size 560 at the transmission with a normal power is less interfered since Cell 4 transmits a normal power to the corresponding resource subspace (the first resource subspace) even though the user 590 is not far from Cell 4.

Therefore, as given in FIG. 5, a system having a frequency reuse efficiency of 1 can be configured while maintaining the inter-cell interference similar to that of a system having a frequency reuse efficiency of ⅓. This method generates more effects by applying the number of traffic subspaces in consideration of cell arrangement and sector arrangement.

Figure 6:
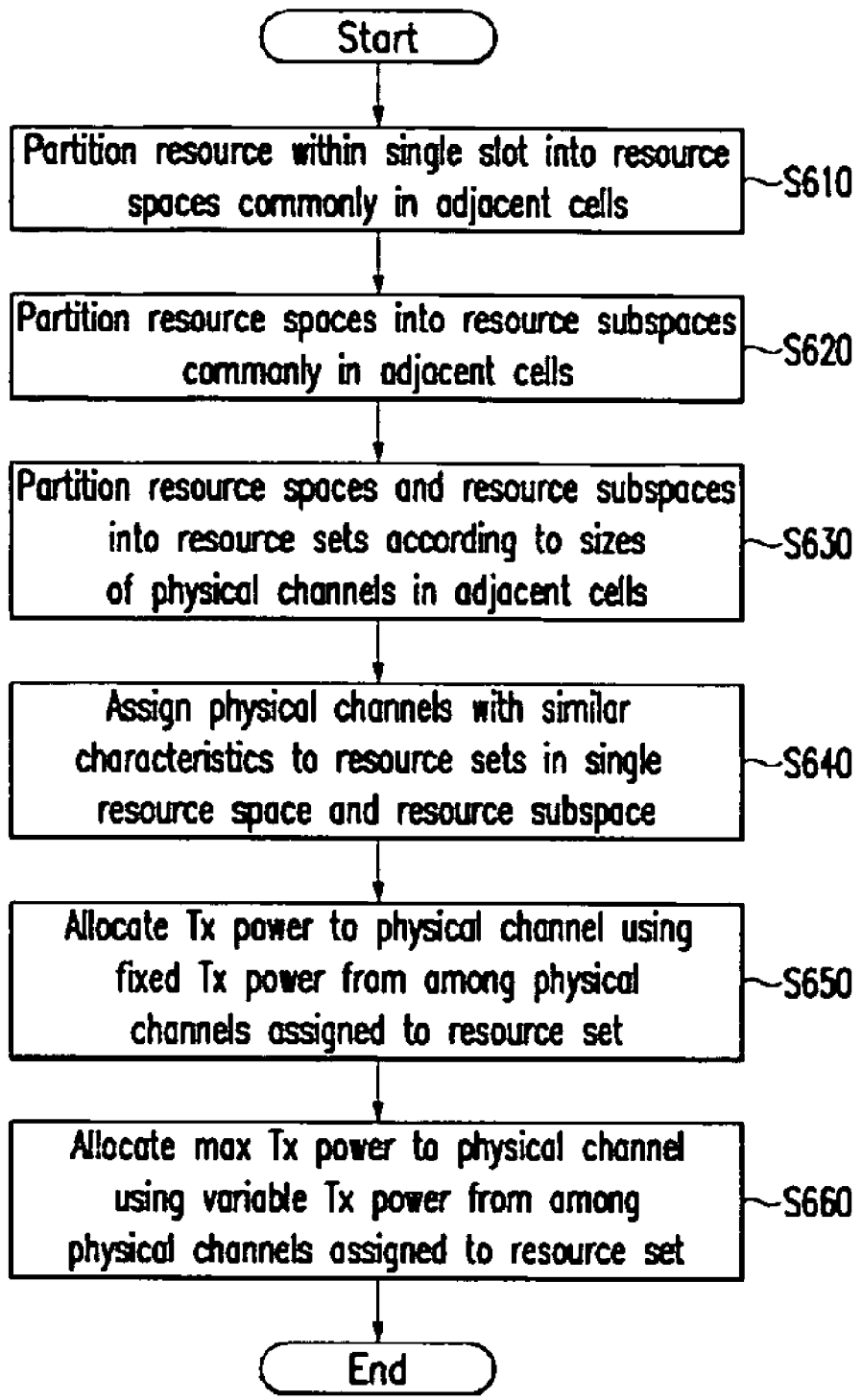
FIG. 6 shows a flowchart for partitioning resource spaces, resource subspaces, and resource sets, and assigning physical channels and transmit powers in an OFDMA-based cellular system according to a preferred embodiment of the present invention.

FIG. 6 shows a flowchart for partitioning resource spaces, resource subspaces, and resource sets, and assigning physical channels and transmit powers in an OFDMA-based cellular system according to a preferred embodiment of the present invention.

Referring to FIGS. 3 and 6, a resource within as lot is partitioned into resource spaces 350 in common from a plurality of adjacent cells so that a combination of part or all of the common channels 300, the dedicated control channels 310, the shared control channels 320, the dedicated traffic channels 330, and the shared traffic channels 340 is allocated in a resource space in step S610.

The partitioned resource spaces 350 are partitioned again into resource subspaces 360 in common in a plurality of adjacent cells if necessary in step S620. In this instance, the resource spaces through which the common channel, the dedicated control channel, and the shared control channel are transmitted can be partitioned into resource subspaces so that the channel shaving the similar physical channel characteristics may be transmitted in a single subspace.

The partitioned resource spaces 350 and the resource subspaces 360 are partitioned into resource sets 370 according to sizes of the respective physical channels in the adjacent cells so that a resource set 370 within the resource space 350 or the resource subspace 360 may be collided as uniformly as possible with all the resource sets within the same resource space or resource subspace of another adjacent cell in step S630.

The physical channels having the similar characteristics are respectively assigned to the partitioned resource sets 370 within the resource space 350 or the resource subspace 360 in step S640.

A transmit power of the resource space 350 or the resource subspace 360 is assigned to the physical channel which uses a fixed transmit power from among the assigned physical channels in consideration of cell sizes, interference of adjacent cells, and required SNR in step S650.

A transmit within the maximum transmit power of the resource space 350 or the resource subspace 360 is assigned to the physical channel which uses a variable transmit power from among the assigned physical channels in consideration of cell sizes, interference of adjacent cells, and required SNR in step S660. In this instance, the subcarriers which constitute the resource space 350 or the resource subspace 360 can be configured by using at least one subcarrier set which covers a wide frequency band and has a predetermined spacing.

In addition, the resource space 350 through which the traffic channels are transmitted can be partitioned into resource subspaces 360 by the number of adjacent cells according to a cell arrangement, a transmit power higher than another resource subspace can be allowed to a resource subspace 360 for each cell, and the resource subspace 360 with the allowed high transmit power can be varied for each adjacent cell. Also, the user who needs a high transmit power for each above-noted cell is required to use the traffic channel of the resource subspace 360 having the allowed high transmit power, thereby reducing the interference of the adjacent cell and increase the frequency reuse efficiency.

Through the above-described method, a cell configuration or a cell reconfiguration for partitioning the resource space 350, the resource subspace 360, and the resource sets 370, and assigning the physical channels and the transmit power in the OFDMA-based cellular system can be executed.

As a result, the preferred embodiment of the present invention partitions a resource (a subcarrier within an OFDM symbol) into resource spaces, averages interference of the channels having similar characteristics in each resource space by using different frequency hopping patterns for the respective cells, and controls the power transmittable to the resource space for each cell, thereby easily controlling the inter-cell interference and increasing the frequency reuse efficiency.

Also, the inter-cell interference is easily controlled for respective channels with different characteristics in the OFDMA-based cellular system, and a method for partitioning the resource spaces and assigning the physical channels for improving the frequency reuse efficiency is provided, so that the common channels and the control channels having similar required SNRs between two different cells may be collided each other, thereby easily controlling the interference from the adjacent cells.

Further, the resource space for transmitting the traffic channels between the two different cells is partitioned into subspaces so that the traffic channels within the same subspace may be collided. Strict power control is performed between the collided channels to control the interference from the adjacent cells. Then the frequency reuse efficiency of the cellular system are increased and thus the performance of the total system is enhanced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A method of partitioning resource spaces and assigning physical channels and power in an OFDMA (orthogonal frequency division multiple access)-based cellular system which comprises a plurality of base stations and a plurality of cells associated with the base stations, said method comprising:
   (a) partitioning a resource within each slot of the cellular system into resource spaces, in common in adjacent cells of the cellular system;
   (b) further partitioning the partitioned resource spaces into resource sets according to respective sizes of physical channels in the adjacent cells, wherein the resource sets within one resource space of one of the adjacent cells are arranged to be collided as uniformly as possible with all the resource sets within the same resource space of another adjacent cell;
   (c) assigning the physical channels classified based on characteristics to the partitioned resource sets within the respective resource spaces;
   (d) allocating a transmit power of the resource space to a physical channel which, among the physical channels assigned to the resource set, uses a fixed transmit power; and
   (e) allocating a power within the maximum transmit power of the resource space to a physical channel which, among the physical channels assigned to the resource set, uses a variable transmit power.

2. The method of claim 1, wherein the physical channels comprise one or more of common channels, dedicated control channels, shared control channels, dedicated traffic channels, and shared traffic channels and are allocated to at least one of the resource spaces of each cell.

3. The method of claim 1, wherein subcarriers which constitute the resource spaces are configured by at least one subcarrier set which covers at least one wide frequency frequency band and has a predetermined spacing.

4. The method of claim 1, wherein the transmit power is allocated by considering cell sizes, interference of adjacent cells, and a required SNR (signal to noise ratio).

5. The method of claim 1, wherein the maximum transmit power is allocated by considering cell sizes, interference of adjacent cells, and a required SNR (signal to noise ratio).

6. A method of partitioning resource spaces and assigning physical channels and power in an OFDMA (orthogonal frequency division multiple access)-based cellular system which comprises a plurality of base stations and a plurality of cells associated with the base stations, said method comprising:
   (a) partitioning a resource within each slot of the cellular system into resource spaces, in common in adjacent cells of the cellular system;
   (b) further partitioning the partitioned resource spaces into resource subspaces, in common in the adjacent cells;
   (c) further partitioning the partitioned resource spaces and the partitioned resource subspaces into resource sets according to respective sizes of physical channels in the adjacent cells, wherein the resource sets within one resource space or subspace of one of the adjacent cells are arranged to be collided as uniformly as possible with all the resource sets within the same resource space or subspace of another adjacent cell;
   (d) assigning the physical channels classified based on characteristics to the partitioned resource sets within the respective resource spaces and the resource subspaces;
   (e) allocating a transmit power of the resource subspace to a physical channel which, among the physical channels assigned to the resource set, uses a fixed transmit power; and (f) allocating a power within the maximum transmit power of the resource subspace to a physical channel which, among the physical channels assigned to the resource set, uses a variable transmit power.

7. The method of claim 6, wherein
   the physical channels comprise one or more of common channels, dedicated control channels, and shared control channels; and
   said (b) comprises partitioning each resource space, through which the common channels, the dedicated control channels, and the shared control channels of each cell are transmitted, into the respective resource subspaces so that the channels with similar physical channel characteristics may be transmitted in a single one among the subspaces.

8. The method of claim 6, wherein subcarriers, which constitute the resource spaces and the resource subspaces, are configured by at least one subcarrier set which covers at least one wide frequency band and has a predetermined spacing.

9. The method of claim 6, further comprising: partitioning the resource space, through which a traffic channel is transmitted, into resource subspaces by the number of adjacent cells according to a cell arrangement; and for each cell, allocating to a resource subspace a transmit power higher than that of the other resource subspace, wherein the resource subspace with the higher transmit power varies from one cell to another cell among the adjacent cells.

10. The method of claim 9, further comprising:
   allowing a user, who needs a high transmit power in each cell, to use a traffic channel of the resource subspace with the higher transmit power.

* * * * *